United States Patent [19]

Stalder et al.

[11] Patent Number: 4,742,990
[45] Date of Patent: May 10, 1988

[54] GATE VALVE

[75] Inventors: Hans Stalder; Hans Sidler, both of Eschenbach, Switzerland

[73] Assignee: Sistag Maschinenfabrik Sidler Stalder AG, Switzerland

[21] Appl. No.: 70,571

[22] Filed: Jul. 7, 1987

[30] Foreign Application Priority Data

Jul. 7, 1986 [CH] Switzerland ............ 2737/86

[51] Int. Cl.⁴ .................................................. F16K 3/316
[52] U.S. Cl. ................................. 251/32 G; 251/329; 138/94.3
[58] Field of Search ............ 251/326, 327, 329; 138/94.3

[56] References Cited

U.S. PATENT DOCUMENTS 3,662,778  5/1972  Leopold et al. ............... 251/326 X
3,945,606  3/1976  McDonald ..................... 251/326

Primary Examiner—Arnold Rosenthal
Attorney, Agent, or Firm—McGlew and Tuttle

[57] ABSTRACT

A sliding plate of a gate valve is guided in guide grooves formed in the region of a flow passage of the two-part gate valve housing. Each guide groove is bounded on both sides [upstream and downstream] by guide strips which extend into the flow channel. The guide strips have axially outwardly directed chamfers, and each such strip has a circular arcuate shaped recess. The recess, which starts at the upper entry point of the guide groove into the flow channel, extends to the lower third of the guide strip. The maximum depth of the recess is 3-5 mm less than the depth (t) of the guide groove 4b. The guide grooves 8a, 8b provide problem-free guiding of the sliding plate when said plate is moved to its closed position, particularly when said plate is moving through the lower third of the flow channel; nonetheless, the guide grooves 8a and 8b present only minimal flow resistance. When the sliding plate is being closed, material which may have deposited in the relatively short parts of the grooves which parts are not affected by the recess, can be expelled without problems via the closing-edge of the sliding plate.

8 Claims, 4 Drawing Sheets

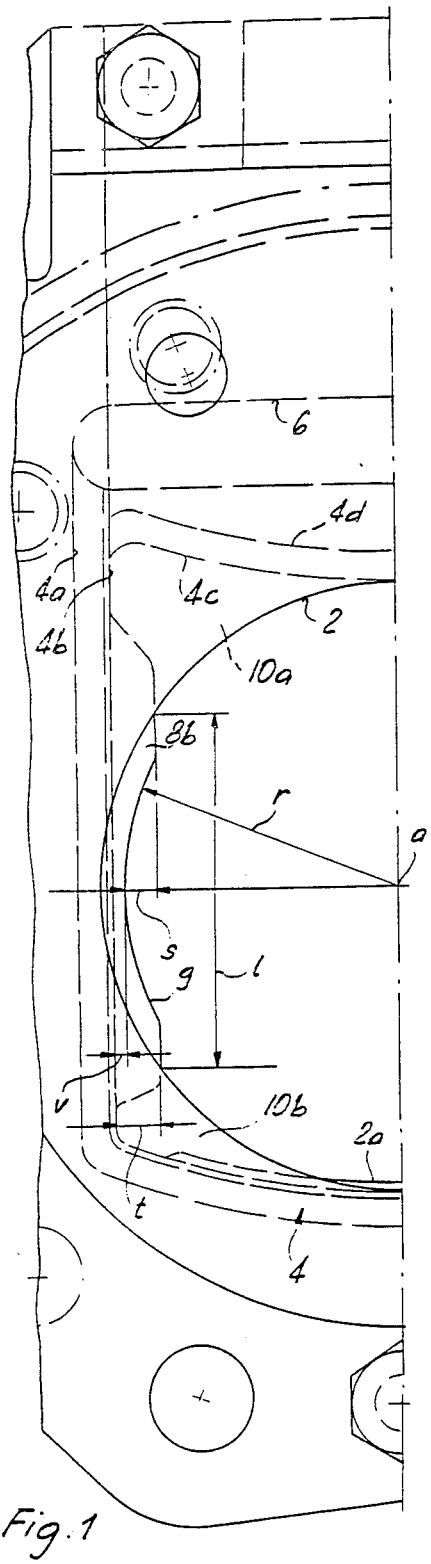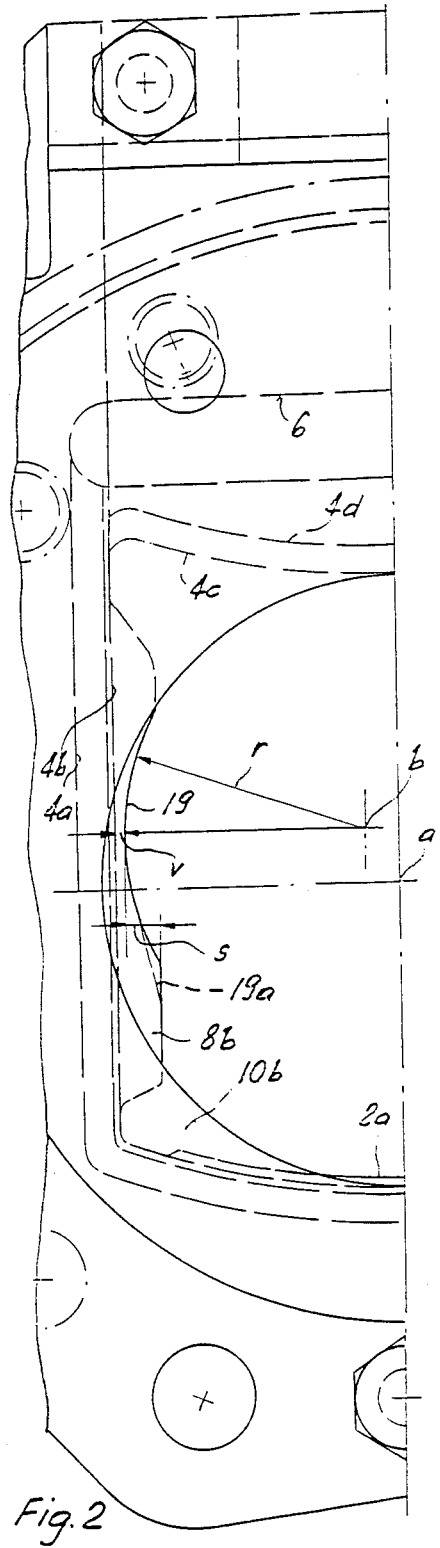
Fig. 1
Fig. 2

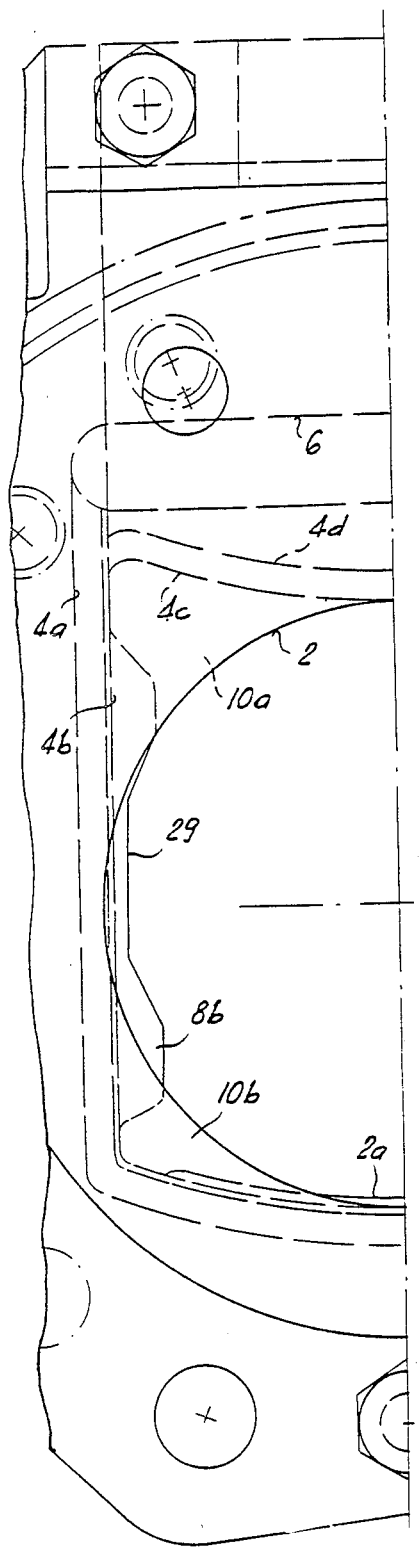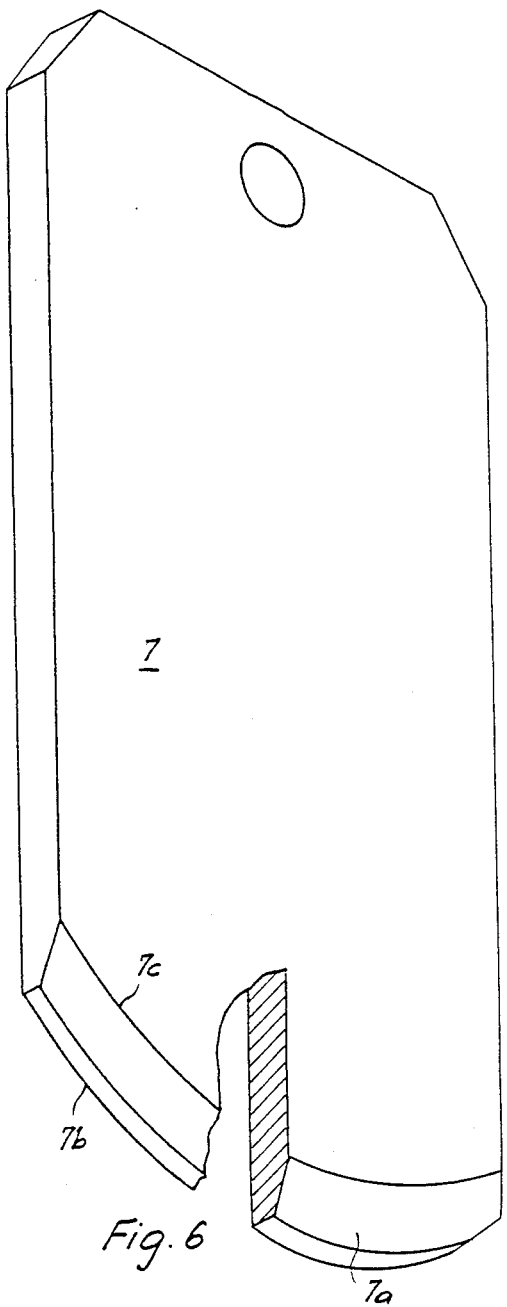
Fig. 5
Fig. 6

GATE VALVE

BACKGROUND OF THE INVENTION

Field of the Invention

The invention relates particularly to a gate for slide valve, particularly for interrupting the flow of thick, viscid, finely, divided, or granular materials in conveying pipes, said valve comprised of a guide groove in the valve housing, for guiding the sliding plate, which guide groove is bounded laterally, in the valve internal flow passage having circular cross section, by pairs of guide strips which extend into flow passage.

When the sliding plate is in its open position, material of the medium being conveyed can settle in the guide groove. When the plate is then closed particularly if this closing occurs only at long time intervals, these deposits depending on their nature and amount can lead to frictional resistance which makes closing difficult; and to rapid wearing away of the guided edge of the plate. Accordingly, the lateral edge parts of the usually circular closing edge of the sliding plate, which edge in cross section usually has a recessed lower i.e. downstream region, are generally unable to expel any and all material which is deposited in the relatively long guide groove, by scraping the deposits from the wall of the groove. In addition there is a hazard that material thus scraped free, instead of moving into the main valve opening i.e., the flow passage, will be pushed into the lower i.e., closure guide groove bottom, in FIG. 2 which joins the lateral guide grooves, thereby making if difficult or impossible to completely move the sliding plate into closed position.

Accordingly, it has been proposed to provide the guide strips with a plurality of notches in relatively close succession, in the region of valve flow passage. When the sliding plate is in its open position, practically no material can deposit from the medium which flows through these notches. And when the sliding plate is in the process of being closed, any small amount of material deposited in the relatively short groove segments between notches can be pushed by the closing-edge of the sliding plate up to the next notch, where the material can then be washed away by the remainder of the flow.

Apart from the fact that the presence of the notches makes the valve housing more difficult to manufacture, the relatively narrow notches have the disadvantage that when the sliding plate is open they cause major disturbances to the flow in the flow passage, which flow is otherwise relatively smooth. These disturbances are detectable upon visual inspection. They result from the projection into the cylindrical flow passage of the guide strips bearing a plurality of generally sharp-edged notches, which projections have the effect of a set of gear teeth.

SUMMARY OF THE INVENTION

The present invention provides a gate valve which is simpler to manufacture than the known type with notched guide strips, which inventive valve in particular causes much less resistance to the flow in the flow passage, and which affords little opportunity for material in the flow medium to become lodged in the valve mechanism, but rather ensures problem-free guiding of the sliding plate during the closing operation.

Toward this end, the inventive gate valve is characterized in that each of the guide strips of the two lateral pairs has a recess the depth of which is less than the depth of the guide groove, and the length of which is at least twice the depth of the guide groove.

The shape of the recess in each of the guide strips, considered in the cross section transverse to the flow axis, may be arcuate, particularly circularly arcuate or trapezoidal. Advantageously, the greatest depth of the recess is 3-5 mm less than the depth of the groove, and the length of the open side of the recess is greater than half the chord length of the guide strip within the flow passage. Despite a relatively large recess, it is desirable to have a relatively large remaining support surface on the downstream-side guide strips, in the lower (FIG. 2) region of the flow passage, and thus a correspondingly low stress generated by the medium impinging on the lower region of the plate.

Accordingly, the longitudinal midpoint of the recess is advantageously farther up than the axis of the flow passage. Advantageously, the configuration is devised such that in the upper region the recess begins immediately at the point where the guide strip enters the flow channel, and ends approximately in the lower third of the guide strip.

Accordingly, it is an object of the invention to provide a sliding plate gate valve housing which a comprises a housing of two parts which has a flow channel and defines slide grooves around each side of the channel which guide strips bounding both the upstream and downstream ends of hte guide groove and extending into the flow channel wherein, the guide strips each have an annular arcuate recess with axially outwardly directed chamfers, said recess being circularly arcuately shaped. Starting from an upper part of said guide group which enters into said flow channel and extends into the lower third part of the guide strip wherein the recess has a maximum depth of from 3-5 mm less than the depth of the guide group.

A further object of the invention is to provide a sliding plate gate valve housing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention is illustrated.

BRIEF DESCRIPTION OF THE DRAWINGS

In the drawings:

FIG. 1 is a front view of half of a first embodiment of an inventive valve;

FIG. 2 is a front view, analogous to FIG. 1, of a second embodiment;

FIG. 5, is a front view, analogous to FIG. 1, of a third exemplary embodiment; and FIG. 6, is a schematic, partial cutaway of the sliding plate according to FIG. 3.

GENERAL DESCRIPTION OF THE PREFERRED EMBODIMENTS

Figure 3:
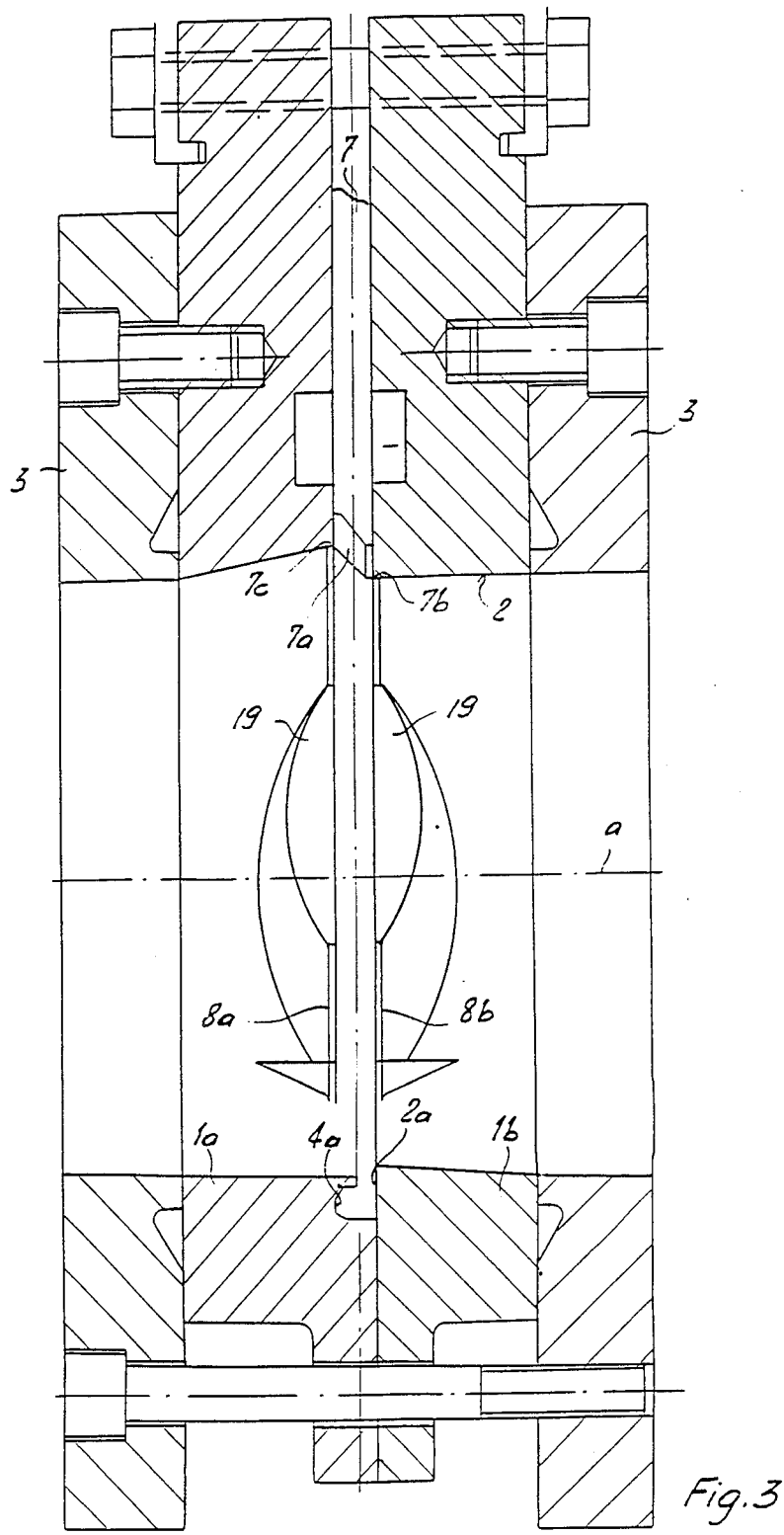
FIG. 3 is an axial cross section of the embodiment according to FIG. 2.

Referring to the drawings in particular the invention embodied therein comprises a sliding plate gate valve housing which comprises a housing of two parts, 1a and 1b, having a flow channel to and defining respective guide grooves, 4a and 4b, on each side of the channel wherein a guide strip bounds each of the upstream and downstream sides of each guide groove and extend into the flow channel. The guide strips having circularly arcuate recesses with axially outwardly directed chamfers the recess starting from an upper part of the guide groove which enters into the flow channel and extends into the lower third part of the guide strip. The recesses having a maximum depth of from 3–5 mm less than the depth of the guide groove.

The gate valve as described in Swiss patent application Nos. G 6908/81 and G 6034/84 has housing parts 1a and 1b which are firmly and rigidly connected via additional flanges 3. The cylindrical flow passage is designated 2. The upstream housing part 1a has an annular recess 4 which surrounds the passage 2 and is U-shaped. The narrowed part 4a of recess 4 serves as a sealing groove for accommodating a seal or packing 5 which is laid in known fashion up to the neighborhood of a transverse seal for packing 6. A widened part 4b of the recess 4 serves as a guide groove for the sliding plate 7. In the region of the flow passage 2, guide groove 4b is bounded laterally by surfaces of a pair of guide strips 8a and 8b which strips extend into the flow passage 2 with their exterior sides, i.e. sides facing away from the plane of the sliding plate, sides being inclined so as not to form flow-retarding impingement surfaces or undercut configurations. The interior surfaces of strips 8a and 8b, top and bottom, are extended beyond the region of the flow passage 2, and they end in flushing corners (10a, 10b) which are broadened with respect to the guide groove 4b and are open to the flow passage 2. The lower dead center, along line A—A of FIG. 1, part of the interior wall of the downstream housing part 1b, which wall bounds the flow passage 2, is slightly inclined upward, i.e., toward the axis of the passage 2, with progression toward the plane of separation of the two housing parts 1a, 1b, so as to project a few millimeters toward the axis of the flow passage 2 at the dead center point of the passage 2, i.e. at the corner of the intersection of plane A—A with wall 1b. This projecting wall part 2a, which on both sides extends into the flushing corners 10b FIG. 1, serves in known fashion as a bearing surface for the segmentally shaped lower closing edge of the plate 7 in the closed position of said plate, which edge is recessed on the upstream side by means of a chamfer 7a.

In the region of the upper dead center point of the flow passage 2, the housing part 1a is inclined toward the arcuate shape of the sliding plate 7 such that in the open position of plate 7 (FIG. 3) the lower edge 7c of the closing face of plate 7 comes precisely up to the dead center edge of the flow passage 2, and the opposite lower edge 7b of the closing face of plate 7 is flush with the dead center point of the inclined surface 2b. The curved end edges 4c, 4d of the plate guide which edges run from these dead center locations along plane A—A and match the arcuate shape of the closing edge of the sliding plate 7 define the upper boundary of the flushing corners 10a between the upper regions of the housing parts 1a, 1b.

As seen from FIG. 1, the two guide strips 8a, 8b of each pair of guide strips (with only the left being shown in FIG. 1) are each provided with a circular arcuate recess 9 the radius r of which lies on the axis of the [generally] cylindrical flow passage 2. This radius r falls short of the depth t of the guide groove 4b bounded by the strips 8a and 8b, with the remaining distance being v advantageously equal to 3–5 mm; i.e., the recess 9 at its deepest point s does not extend to the bottom of the groove, so that guide surfaces remain for the sliding plate 7 even at the said deepest point of recess 9. Recess 9 is symmetrical with respect to the axis of the flow passage 2 and extends over most of the length 1 of the guide strips 8a and 8b [within said passage]; nonetheless sufficient supporting surface is left over apart from recess 9 (particularly in the lower third of the passage 2, in which closing region the sliding plate is subjected to particularly strong forces). The relatively short fullguide surfaces lying outside the region cut into by the recess 9, which surfaces have the full width t and which extend upward to the flushing corners 10a and downward to the flushing corners 10b, ensure that the sliding plate 7 can readily downwardly expel any material lodged (or deposited) locally in the grooves in the closing path of said plate, with material scraped off by the plate 7 from the upper regions of the grooves being pushed into the passage directly, through the recess 9, and the material expelled from the lower regions of the grooves being pushed into the flushing corners 10b whence it is flushed into the passage 2. It is seen from FIG. 1 that only a relatively narrow cross sectional area of the guide strips extends into the flow cross section of the passage 2, and since these strips are strongly chamfered in the axial direction, they do not cause major flow resistance.

There is no essential need for the configuration of the recess 9 to be circularly arcuate. It may have an elliptical or trapezoidal shape (FIG. 5), and its curve may be centered to some extent other than at the channel axis a (see FIG. 2). In any event the important benefit of this single elongated recess in each guide strip is that it substantially simplifies the manufacture (casting) of the housing parts in comparison to known structures having a plurality of narrow notches.

Figure 4:
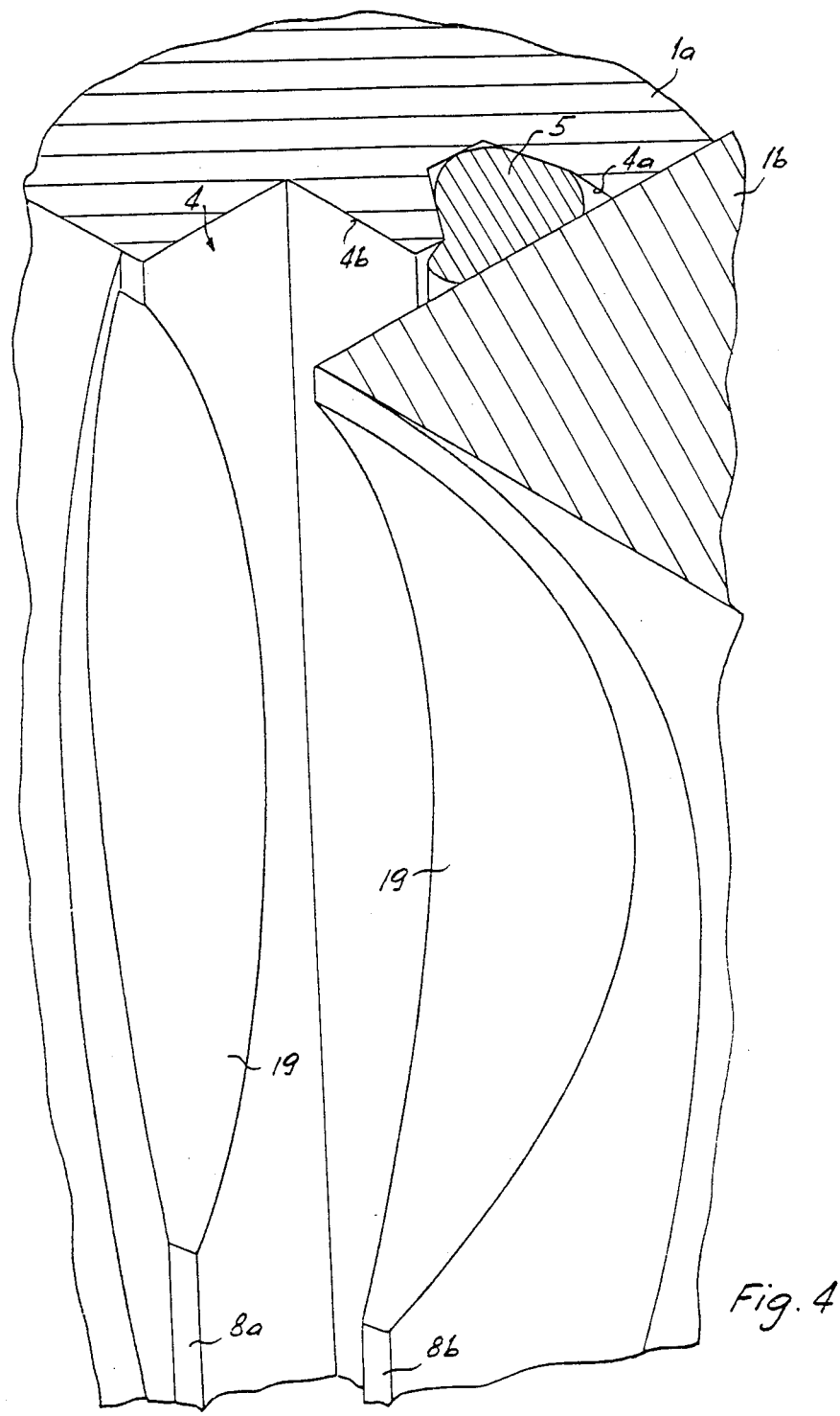
FIG. 4 is an enlarged, schematic detail of the embodiment according to FIG. 2.

A particularly advantageous embodiment of the invention is illustrated in FIGS. 2–4. The gate valve illustrated here differs from the example according to FIG. 1 only in thatthe recesses 19 of the guide strips 8 have a different configuration. The shape of the recess 19 is still that of a circular arc, but the center b is shifted slightly laterally toward the recess and upward from the axis of the flow passage. This distance by which the center of curvature is shifted, it turns out, is advantageously less than half the radius of the flow passage, wherewith the center of curvature always lies within a rectangle in the upper quadrants of the flow passage cross section, the sides of which rectangle have lengths which in practice are advantageously between 15 and 35 mm. As seen in FIG. 2, the recess 19 starts immediately at the upper entrance of the groove 4b into the flow passage 2, and its greatest depth s is also less than the depth of the groove t by a distance v=3–5 mm. The lower end of the recess 19 is generally in the lower third of the guide strips. Thus, the length of the recess is a multiple of the depth of the groove. An important advantage of this configuration [over that of FIG. 1] is the relatively large guide surface provided for the sliding plate in the lower region of the flow passage 2. In order to further reduce the flow resistance of the lower guide strip region, the edges of the guide strips at the lower end of the recess, which edges run parallel to the axis [of the flow channel], can be rounded (19a, dashed lines, FIG. 2). (Obviously, this rounding modification is also applicable to the configuration according to FIG. 1.)

As mentioned supra in connection with FIG. 1, the recesses 19 may have shapes other than of a circular arc (e.g., elliptic, rectangular, or trapezoidal). A trapezoidal recess 29 is illustrated in the example of FIG. 5, which example corresponds to FIG. 2 in all other respects.

All the examples have the common feature that each guide strip has only a single elongated recess which does not extend completely to the bottom of the groove, and this recess in the outwardly chambered (in the axial direction [of the flow passage]) guide strip does not make manufacture of the housing more difficult or complex but does eliminate strip parts in the passage which parts would provide substantial flow resistance; and while the recess does affect the guide groove for the sliding plate over a relatively long distance [along said groove], it nowhere completely eliminates the groove. Accordingly, the sliding plate remains guided in its closing (and opening), without guiding-problems arising, particularly in the lower region of the flow passage, and the plate can expel material which has deposited or is lodged in the non-recessed segments of the guide grooves, without problems arising in connection with said expulsion.

While specific embodiments of the invention have been shown and described in detail to illustrate the application of the principles of the invention, it will be understood that the invention may be embodied otherwise without departing from such principles.

What is claimed is:

1. Housing for a gate valve, particularly for interrupting flow of thick, viscous, finely divided, or granular materials in conveying pipes, said housing having a guide groove preformed therein around a central flow channel for guiding a sliding plate of the valve, said guide being bounded laterally by pairs of guide strips which extend into said flow passage, each guide strip on each side of said sliding plate and on both upstream and downstream sides defining there between a recess having a depth which is less than the depth of the guide groove, each recess has a length which is at least twice the depth of the guide groove.

2. A valve according to claim 1; wherein said recess in the guide strips begin at an upper point where the guide groove enters into the flow channel and ends in a lower third of the guide strip.

3. A valve according to claim 1, wherein said recess has an arcuate shape and is of circular arcuate configuration with a center of curvature above the axial plane of the flow passage, which plane is normal to the plane of the sliding plate.

4. A valve according to claim 1, wherein said guide strips have edges which are parallel to the axis of the flow passage and bound the recess and they are rounded.

5. A valve according to claim 1, wherein the depth of the recess of the guide strips is less than the depth of said guide groove by 3-5 mm.

6. A valve according to claim 1, wherein said guide groove bounded by said guide strips and extends upwardly beyond the section of the flow passage in said extension region of said groove and opens into respective flushing corners.

7. A sliding plate valve comprising a housing of two parts having a flow channel and defining a guide groove around each side of said flow channel, a guide strip bounding both upstream and downstream sides of said guide groove and extending into said flow channel, said guide strips each having a circularly arcuate recess with axially outwardly directed chamfers, said recess starting from an upper part of said guide groove which it enters into said flow channel and extends into the lower part of said guide strip, said recess having a maximum depth of from 3-5 mm less than the depth of said guide groove.

8. A sliding plate valve according to claim 7, wherein said guide strips end before the lower end of said guide groove and define flushing corners within said housing.

* * * * *